United States Patent [19]

McAlister

[11] 4,313,427
[45] Feb. 2, 1982

[54] HEAT EXCHANGER
[76] Inventor: Roy E. McAlister, 5285 Red Rock, North, Phoenix, Ariz. 85018
[21] Appl. No.: 213,080
[22] Filed: Dec. 4, 1980

Related U.S. Application Data

[60] Division of Ser. No. 6,240, Jan. 24, 1979, which is a continuation of Ser. No. 774,501, Mar. 4, 1977, abandoned.

[51] Int. Cl.$^3$ ............................................. F24J 3/02
[52] U.S. Cl. ................................. 126/441; 126/445; 126/448; 126/449
[58] Field of Search ................ 126/441, 445, 448, 449

[56] References Cited
U.S. PATENT DOCUMENTS

| | | | |
|---|---|---|---|
| 574,157 | 12/1896 | Ljungstrom | 165/166 |
| 1,034,465 | 8/1912 | Kennedy et al. | 126/448 |
| 1,383,408 | 7/1921 | Leister | 122/261 |
| 3,249,155 | 5/1966 | Huet | 165/166 |
| 3,830,065 | 8/1974 | McAlister | 60/670 |
| 3,957,030 | 5/1976 | Davis | 126/448 X |

Primary Examiner—Albert W. Davis
Attorney, Agent, or Firm—Cushman, Darby & Cushman

[57] ABSTRACT

A heat exchanger in which the main component is formed of a plurality of elongated strips of rigid heat conductive material. Each of the strips has a cross-sectional configuration which is elongated in a direction transverse to the elongated extent of the strip so as to provide a pair of spaced relatively thin end edges and a pair of relatively wide opposed surfaces extending between the end edges. The strips are generally transversely aligned and wound into a coil formation in which each of the surfaces of each strip is disposed in facing relation to the opposite surface of an adjacent strip in the coil. Each pair of facing surfaces is ridged to provide defining portions and force transmitting portions with certain of the strips having both end edges thereof sealingly secured to the corresponding end edges of an adjacent strip so as to define with the passage defining portions of the facing surfaces associated therewith a longitudinal fluid passage having a flow direction extending generally in the direction of longitudinal extent of the strips and with certain of the strips having both end edges thereof disposed out of sealing engagement with corresponding end edges of the adjacent strip so as to define with the passage defining portions of the facing surfaces associated therewith transverse fluid passage means having a flow direction extending generally in a direction transverse to the direction of longitudinal extent of the strips. The force transmitting portions of each pair of facing surfaces are disposed in force transmitting relation with respect to one another in the direction the facing surfaces face one another so that forces created by the fluid pressure and temperature conditions within the fluid passages tending to deform the strips in the facing directions are resisted to thereby prevent deformation which would otherwise occur in the absence of the force transmitting relationship and permit the utilization of wall thicknesses less than that required to be self-sustaining in order to prevent such deformation.

8 Claims, 15 Drawing Figures

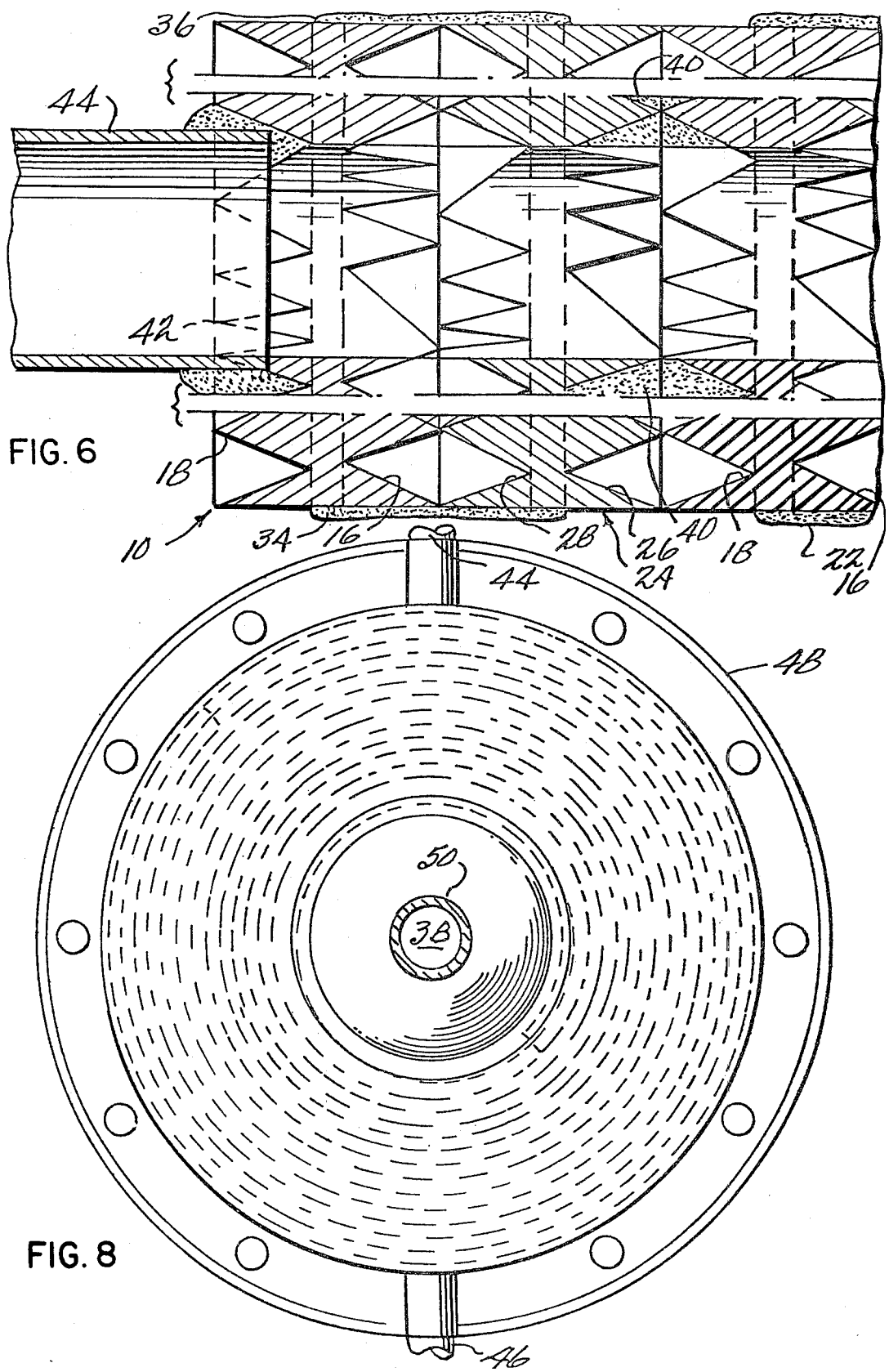

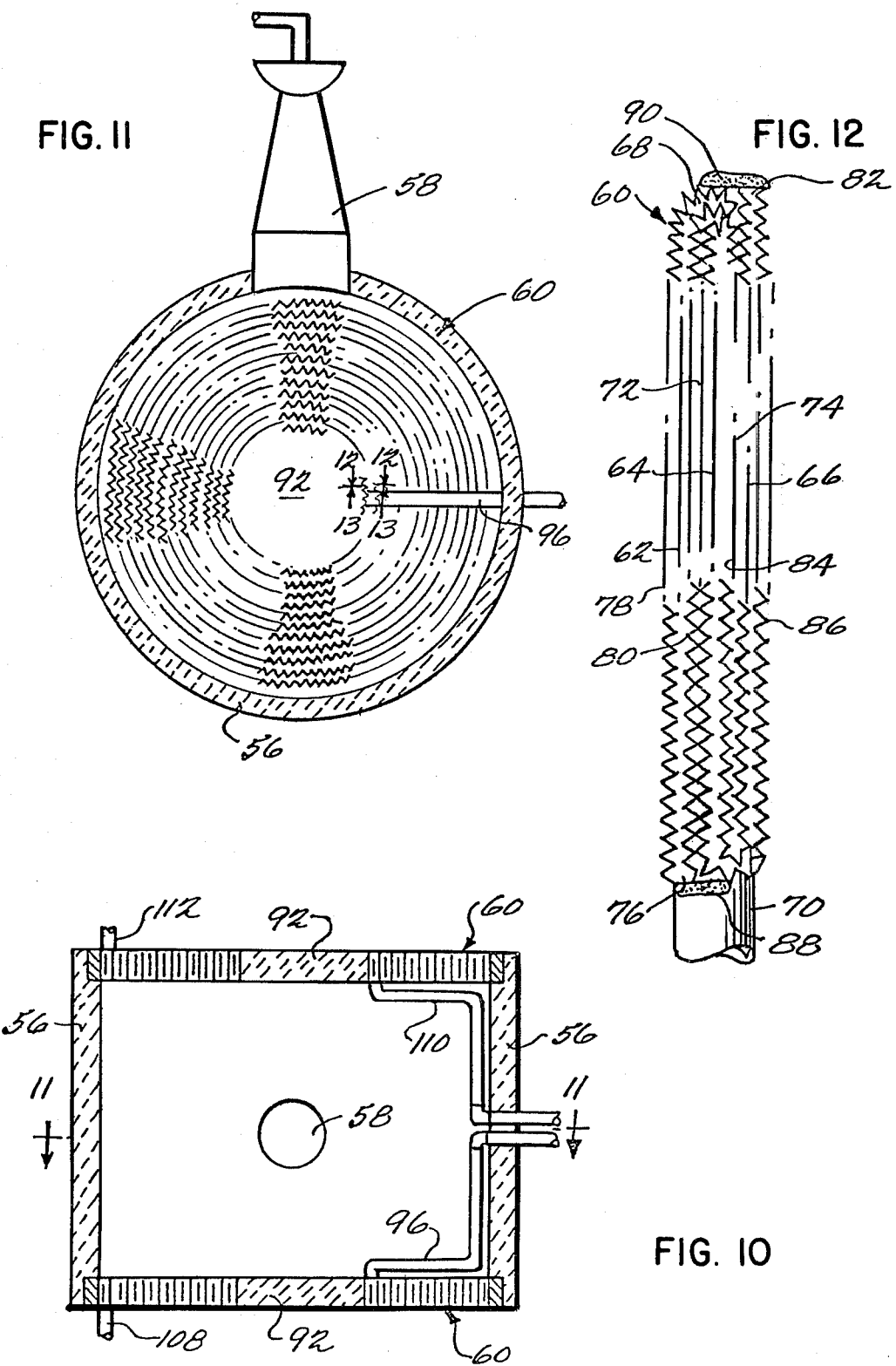

HEAT EXCHANGER

This application is a division of application Ser. No. 6,240, filed Jan. 24, 1979, which is a continuation of application Ser. No. 774,501, filed Mar. 4, 1977, now abandoned.

This invention relates to heat transfer and more particularly to improvements in heat transfer apparatus of the type having applicability to external combustion engines.

The combined pressures of decreasing petroleum and coal supplies, atmospheric pollution, and world wide demand for labor saving conveniences and air-conditioning have generated increased opportunities for external combustion engines. Man's future housekeeping, transportation and manufacturing needs can not be powered by greater numbers of today's petroleum burning engines. The world's fossil fuel reserves are too limited to be used at today's engine efficiencies to last until solar or nuclear power plants replace them.

External combustion engines operating on modified Rankine, Stirling, and Ericson Cycles show considerable promise in reducing the amount of atmospheric pollution per horsepower hour of operation. Such engines have also serves as examples of increased thermodynamic efficiency compared to modern spark ignited internal combustion engines. Bulk and weight problems, however, are usually associated with the external combustion engines because of the large surface areas required by the heat addition and heat rejection portions of the system. Steam boilers tend to be larger and more expensive than carburetors, and steam condensors tend to be larger and more expensive than automotive radiators.

Another problem with external combustion engines concerns the difficulty of handling hot, dry non-lubricating working fluids. Steam engines are particularly noted for problems developing in locations where hot steam cleans relative motion surfaces and thus promotes seizing or galling.

An object of the present invention is the provision of an improved heat exchange apparatus which provides improved heat transfer efficiency through the efficient utilization of the material provided through which the heat transfer takes place. In accordance with the principles of the present invention, this objective is obtained by utilizing a plurality of thin imperforate webs of heat conducting material each of which has a pair of relatively wide opposed surfaces bounded in one direction by a pair of spaced relatively thin end edges so as to provide the web with a cross-sectional configuration which is elongated in a direction transverse to said one direction. The webs are generally transversely aligned and disposed in a layer formation in which each of the surfaces of each web is disposed in facing relation to the opposite surface of an adjacent web in the layer formation. Each pair of facing surfaces includes passage defining portions and force transmitting portions. Certain of the webs have both end edges thereof sealingly secured to the corresponding end edges of an adjacent web so as to define with the passage defining portions of the facing surfaces associated therewith first fluid passage means having a flow direction extending generally in said one direction along said webs. Certain of the webs have at least one end edge thereof disposed out of sealing engagement with a corresponding end edge of the adjacent web so as to define with the passage defining portions of the facing surfaces associated therewith second passage means extending transversely inwardly of the aforesaid end edges of the webs toward the opposite end edges thereof. The force transmitting portions of each pair of facing surfaces are disposed in force transmitting relation with respect to one another in the direction the facing surfaces face one another so that forces created by the fluid pressure and temperature conditions within the fluid passage means tending to deform the webs in the facing directions are resisted to thereby prevent plastic deformation which would otherwise occur in the absence of the force transmitting relationship and permit the utilization of wall thicknesses less than that required to be self-sustaining in order to prevent such deformation. In this way less heat conducting material is required and hence the heat transfer is accomplished more effectively.

Preferably, the webs are in elongated strip form, the sealing securement of both end edges being a welding or brazing operation along the edges of two superposed strips. A significant advantage of the invention is the formation of the passage defining portions and force transmitting portions of each facing surface. A preferred method of formation is knurling and a preferred specific formation is the knurling of parallel ridges and troughs extending at an angle between the side edges. Alternatively the ridges and troughs may be formed in the manner of corrugations. When the facing surfaces are disposed in force transmitting relation to one another, the ridges and troughs of one surface extend across the ridges and troughs of the other and the points or areas at which the ridges touch one another constitute the force transmitting portions of the surfaces, whereas the remaining areas constitute the passage defining areas.

The fluid passage configuration provided in the manner indicated above is highly advantageous in that it can be made to define a tortuous path for the movement of the gas or fluid therethrough in such a way that there is enhanced maintenance of a turbulent fluid condition rather than to permit the flow of the fluid to become stratified. It is well known that heat transfer is more effective where the fluid medium is maintained in a turbulent flow condition rather than a stratified flow condition.

Another advantage of the configuration noted above is that the cross-section of the flow path at any position is sufficiently small in relation to the amount of fluid such that change in temperature of the metal due to heat transfer with the fluid is sufficient to cause a change in the flow impedance which thus renders the flow susceptible to a peristaltic action.

Another object of the present invention is the provision of apparatus of the type described which is simple in construction, efficient in operation and economic to manufacture and maintain.

These and other objects of the present invention will become more apparant during the course of the following description and appended claims.

The invention may best be understood with reference to the accompanying drawings, wherein an illustrative embodiment is shown.

In the drawings:

FIG. 6 is an enlarged fragmentary sectional view taken along the line 6—6 of FIG. 5;

FIG. 8 is a top plan view of the structure shown in FIG. 6;

FIG. 10 is a vertical sectional view of a modified form of a heat exchanger;

FIG. 11 is a sectional view taken along the line 11—11 of FIG. 10;

FIG. 12 is a view similar to FIG. 4 taken along the line 12—12 of FIG. 11;

Figure 1:
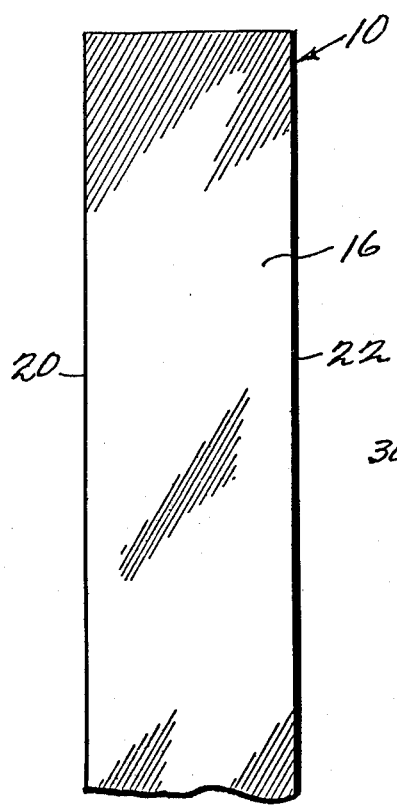
FIG. 1 is a fragmentary plan view of a length of strip utilized in practicing the present invention.
Figure 7:
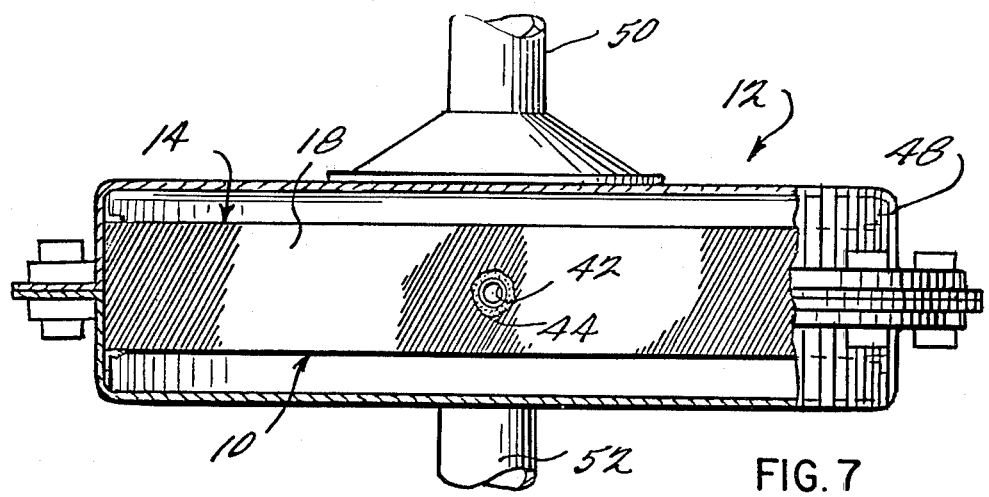
FIG. 7 is a side elevational view with parts broken away of a heat exchanger unit embodying the coil formation structure illustrated in FIG. 5.

Referring now more particularly to the drawings, there is shown in FIG. 1 an elongated strip, generally indicated at 10, which constitutes a preferred form of thin imperforate web of rigid heat conducting material utilized in constructing the apparatus of the present invention. A preferred form of the apparatus of the present invention is illustrated in FIGS. 7 and 8 as a heat exchanger, generally indicated at 12, of a type wherein the heat of one fluid is operable to be exchanged with another fluid. The heat exchanger 12 includes a main component 14 which provides the separate flow paths for both of the fluids and contains the separating heat conducting material through which the heat exchange takes place. In accordance with the principles of the present invention this main component 14 is formed of a plurality of thin webs such as the strip 10. In the preferred embodiment shown in FIG. 1 the strip 10 has a pair of relatively wide opposed surfaces, indicated at 16 and 18, bounded in the longitudinal direction of extent of the strip 10 by a pair of spaced relatively thin end edges 20 and 22. The strip 10 may be made of any suitable rigid heat conducting material, preferred materials being those having a relatively low weight and relatively high specific heat, such as aluminum, magnesium and titanium, and particularly alloys and compounds containing boron, carbon, lithium, beryllium, hydrogen, silicon and nitrogen.

In accordance with the principles of the present invention, the strip 10 has each of the surfaces 16 and 18 formed into a non-planar configuration which includes passage defining portions and force transmitting portions. While the provision of surface irregularities may be effected by any well-known means, in the preferred embodiment shown, the surface irregularity is provided by a conventional knurling process, the knurling tool imparting to the surface 16, as shown, a multiplicity of ridges and troughs which extend from one end edge 20 to the other end edge 22 at an angle thereto. As shown, the angle may be 45° more or less and, as shown, is approximately 30° with respect to the end edges. It is important to note that both the surface 16, as shown in FIG. 1, as well as the opposite surface 18 (see FIG. 4) are provided with the knurled ridges and troughs and that the ridges and troughs on the surface 18 extend angularly from the end edge 20 to the other end edge 22 at substantially the same angle as the ridges and troughs of the surface 18.

Figure 2:
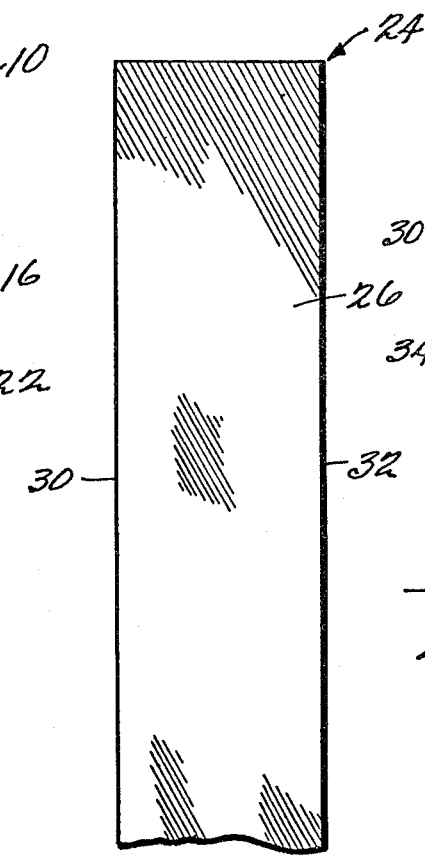
FIG. 2 is a view similar to FIG. 1 showing another strip.

In FIG. 2 there is illustrated a second strip 24 which is similar to the strip 10 previously described in that it includes opposite surfaces 26 and 28 knurled with parallel ridges and troughs and opposite end edes 30 and 32. The strip 24 differs from the strip 10 in that the ridges and troughs on each of the surfaces 26 and 28 extend in the opposite direction than those of the strip 10.

In fabricating the main component 14 of the preferred heat exchanger 12 there are two webs utilized, namely strip 10 and strip 24. These strips are disposed in generally transverse aligned relation with respect to one another in superposed relation with the surface 16 of the strip 10 facing the surface 28 of strip 24. The ridges of the abutting surfaces 16 and 28 will cross one another and the points or areas where the ridges touch one another constitute the force transmitting portions of the surfaces 16 and 28 while the remaining portion of the ridges and troughs constitute the passage defining portions of the surfaces 16 and 28. The end edges 20 and 30 of the strips 10 and 24 are disposed in adjacent relation to one another and are sealingly secured together, as by a line weld or of brazing material, indicated at 34. Likewise the other end edges 22 of strip 10 and 32 of strip 24, which are adjacent one another, are sealingly secured by a line of weld or brazing material 36.

It is important to note that the sealing securement of both longitudinal end edges provided by the lines of brazing material 34 and 36 serves to define with the passage defining portions of the facing surfaces 16 and 28 a first fluid passage having a flow direction extending generally in the longitudinal direction of the two strips.

Figure 14:
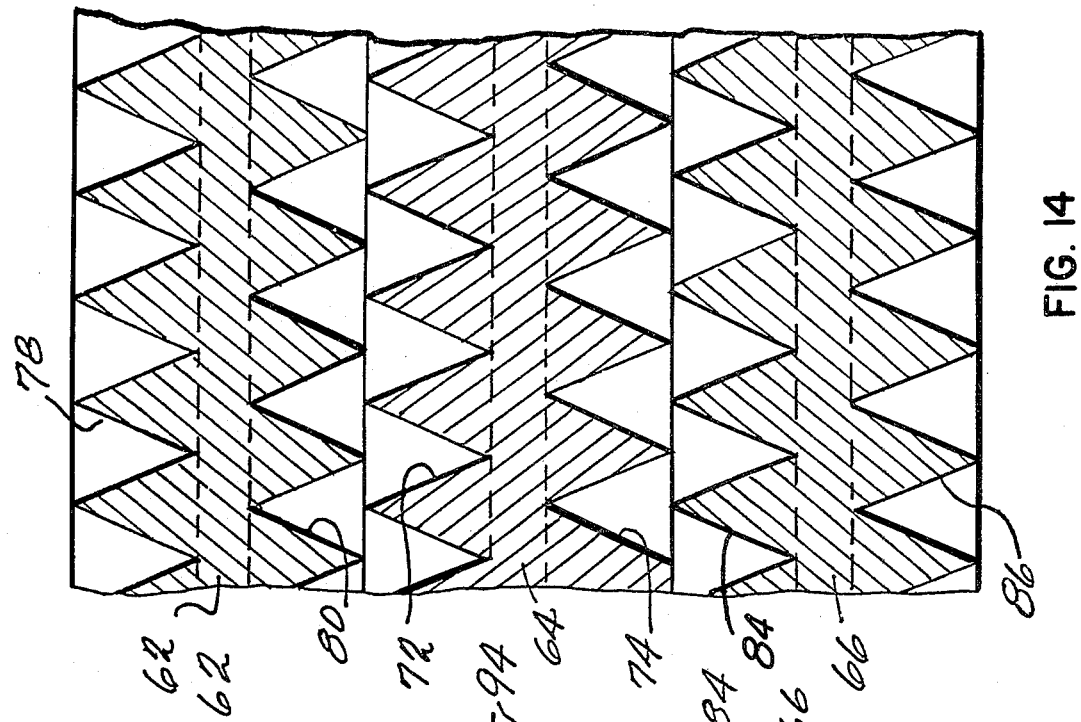
FIG. 14 is a fragmentary sectional view taken along the line 14—14 of FIG. 11.

It is an important aspect of the present invention to achieve a turbulent flow characteristic of the fluid moving through the passage. With the regular corrugated configuration of the ridges and troughs illustrated in FIG. 4, the total open cross-sectional area of the passage provided by the passage defining portions of the surfaces 16 and 28 is constant in the direction of fluid flow (X axis). However, because of the opposite angular extent of the ridges and troughs of surface 16 with respect to those of the surface 28, the cross-sectional area constantly changes as the fluid progresses in the direction of flow. FIG. 4 illustrates one extreme configuration which is presented when the flow is along a plane passing through the interengaging force transmitting portions of the surfaces 16 and 28. The configuration consists of a series of diamond-shaped openings touching one another at adjacent mid-points. The cross-sectional configuration when the flow reaches a plane halfway between the plane shown in FIG. 4 and the plane of the next series of force transmitting portions is in the form of a continuous opening of constant thickness in the form of a straight sine wave (see FIG. 14). Consequently, the position of the open areas defining the passage in the transverse direction (Y axis) and in the direction of thickness (Z axis) is constantly changing as the distance along the direction of travel (X axis) increases. It will be noted that there is theoretically no straight through flow path along an X axis provided. Since the ridges and troughs are of similar outline form in section irrespective of whether the section is taken along a place perpendicular to the longitudinal extent of the strips, as indicated at 4—4 in FIG. 3, or along the longitudinal extent as indicated at 4a—4a, it can be seen that the cross-section of the passage between the surfaces 16 and 28 in the direction of flow constantly varies between the two extreme configurations shown in FIGS. 4 and 14 as the fluid moves along the Y axis. It will be noted that the passage defining surfaces having the configuration shown in FIG. 14 are such as to direct the flow along a sinusoidal path in which the direction of movement has a constant direction X axis component with a Z axis component which changes directions periodically going through zero between direction changes. On the other hand, the passage defining surfaces having the configuration shown in FIG. 4 are such as to direct the flow along intermittent paths in which each path has a constant direction X axis component with one half having a Y axis component in one direction and the other half having a Y axis component in the other direction. Moreover, since the cross-section between the pair of corrugated surfaces 16 and 28 in the X-Y plane varies between the configuration of FIG. 4 and FIG. 14 in the Y axis direction, the flow components in the Y and Z axis directions provide a progressive intermixing of fluid flow in both of these directions throughout the passage face to the outlet face. Moreover, it will be noted that the lines of brazing 34 and 36 have a Y axis component direction reversal function. The total effect is a fluid flow which has an X axis component in only one direction, namely, generally along the longitudinal extent of the strips, and a superimposed Y axis component and Z axis component which periodically changes direction and passes through zero throughout. The constantly varying Y and Z axis components insure a high degree of turbulence throughout without the establishment of laminar flow. This highly turbulent non-laminar flow is maintained in passages having controlled constant cross-section throughout in the direction of flow.

Figure 5:
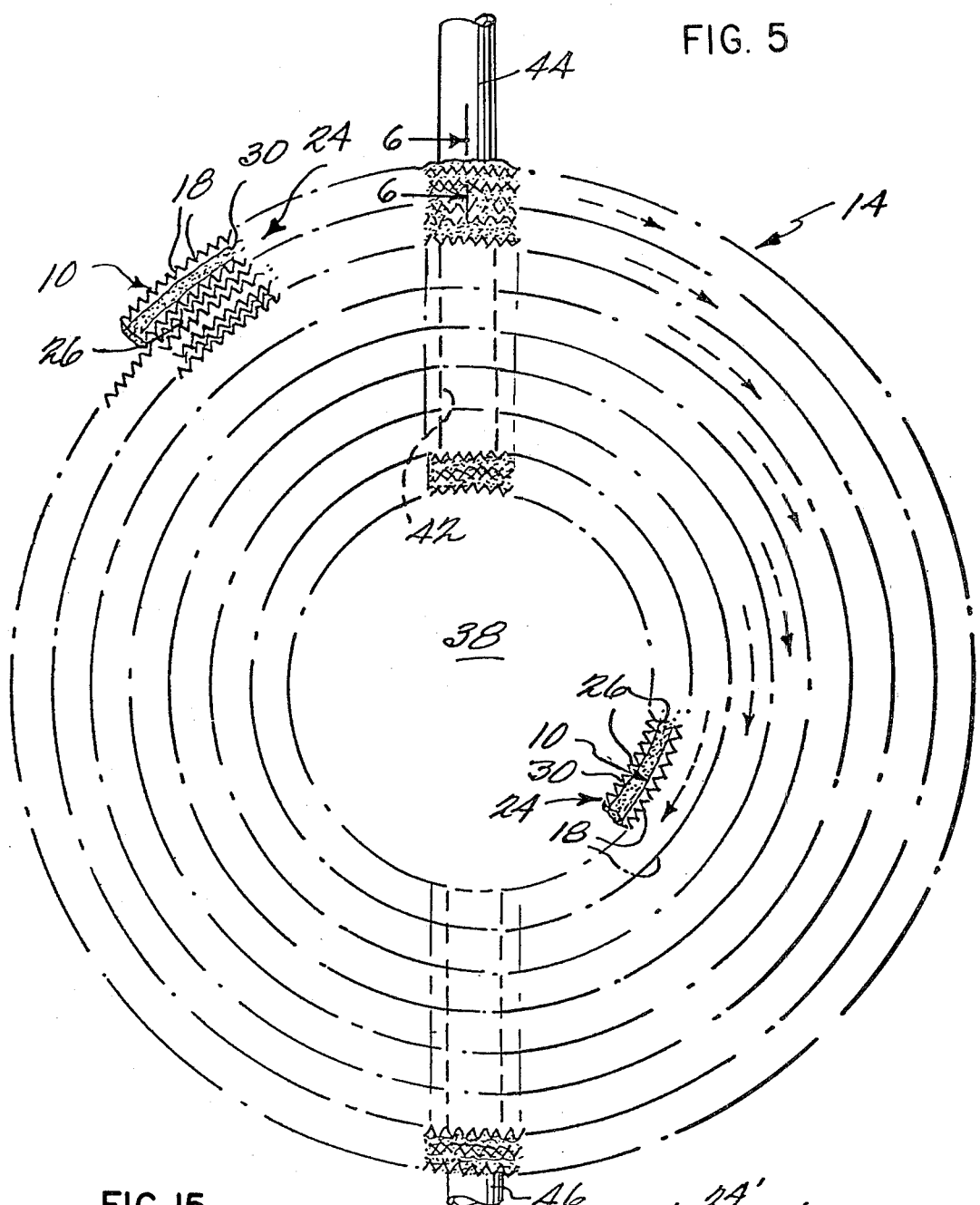
FIG. 5 is a top plan view showing the manner in which the dual strip construction illustration in FIGS. 3 and 4 is wound into a spiral coil formation and provided with inlet and outlet manifolds for the passage of fluid therethrough.

Referring now more particularly to FIG. 5, the main component 14 of the heat exchanger 12 is formed by tightly winding the pair of elongated strips 10 and 24 secured together with the lines of brazing material 34 and 36 into a spiral coil formation about an inner core member 38 which serves to support the interior surface of the interior loop provided by the surface 26. It will be noted that during this winding action as each successive loop is wound in the coil formation, the interior surface 26 provided by strip 24 of the pair of strips will be moved into facing relation with the exterior surface 18 provided by strip 10 of the pair of strips in the preceding adjacent loop. During the winding of the coil formation a wafer of brazing material is inserted between these two surfaces 18 and 26 at diametrically opposed positions about the axis of the member 38 so that when the entire spiral coil formation is completed as shown in FIG. 5, the coil formation can be placed in a furnace and the wafers of brazing material will fuse in the diametrically opposed areas of the coil formation. After the brazing material has fused, as indicated at 40 in FIG. 6, the coil formation is drilled or otherwise provided with a radially inwardly extending manifold passage 42 at each of the diametrically opposed positions. As can be clearly seen from FIG. 6, each manifold passage 42 thus communicates with the first passage defined by the facing surfaces 16 and 28 extending between the lines of brazing material 34 and 36 whereas the remaining facing surfaces 18 and 26 are maintained out of communication with the manifold opening 42 by means of the fused brazing material 40. The arrangement, therefore, permits the mounting of an inlet pipe 44 in the radially outward end of one of the manifold openings 42 and an outlet pipe 46 in the radially outward end of the other manifold 42. With this arrangement a fluid introduced into the inlet pipe 44 will flow into the associated manifold 42 and enter the first passages provided between the surfaces 16 and 28 and the lines of brazing material 34 and 36 so as to flow in both directions along the longitudinal extent of the strips away from the manifold and toward the opposite manifold 42. From the opposite manifold 42 the fluid flows out of the discharge pipe 46.

In this way the main component 14 of the heat exchanger apparatus 12 is preferably fabricated. For purposes of providing exchange of heat from a fluid flowing from the inlet 44 to the outlet 46 the apparatus further includes an exterior housing 48 which provides for peripheral support of the exterior surface 18 of the outer loop of the coil formation. The housing 48 includes an inlet pipe 50 on one side of the coil formation extending into the adjacent side of the housing and an outlet pipe 52 on the opposite side of the coil formation extending outwardly from the adjacent side of the housing. Heated fluid introduced into the inlet pipe 50 will therefore pass through the passages defined by the passage defining portions of the surfaces 18 and 26 facing one another. While the transverse flow through these passages is similar to the longitudinal flow through the passages defined by the ridges and troughs of the facing surfaces 16 and 28, a difference exists because of the lack of the lines of brazing material 34 and 36 and hence lack of the Y axis reversal function thereof. Thus, the flow transversely through the passages defined by the facing surfaces 16 and 28, while turbulent, will tend to stratify in the direction of extent of the troughs since the ends of the troughs are not blocked as is the case with the lines of brazing material 34 and 36 but rather are open to both the inlet and outlet side of the fluid flow path.

It will be understood that the preferred construction described above is susceptible to many variations. For example, rather than utilizing strips 10 and 14 having oppositely directed ridges and troughs in both surfaces with respect to one another, the plurality of strips utilized could be identical with each strip having the ridges and troughs on one surface extending oppositely from the ridges and troughs on the opposite surface. Likewise, while a strip form of web is preferred, the webs may be sheets if desired. Moreover, the surface irregularities may assume other patterns than the preferred ridge/trough arrangement so long as there are provided in the two facing surfaces passage defining portions and force transmitting portions. Moreover, the main component 14 can be formed in a layer formation other than the spiral coil formation of the preferred embodiment (e.g. stack or helical coil). The important consideration here is that the force transmitting portions of the exterior surfaces when disposed in layer formation are mounted in force transmitting relation in the same way as the force transmitting portions of the interior surface are. By arranging the webs in a layer formation in which the force transmitting portions of each pair of facing surfaces are disposed in force transmitting relation with respect to one another in the direction the facing surfaces face one another, it becomes possible to minimize the amount of heat conductive material that is utilized to form the main component 14. In this way, the forces created by the fluid pressure and temperature conditions within the fluid passages tending to deform the webs in the facing directions are resisted so as to prevent deformation beyond the elastic limit of the material which would otherwise occur in the absence of such force transmitting relationship. In short, the arrangement permits the utilization of wall thickness less than that required to be self-sustaining in order to prevent such deformation. It can thus be seen that there is provided with the present arrangement a minimum amount of heat conductive material between the fluid passages for the fluids to be passed in heat exchange relation to one another. Minimizing the amount of heat conductive material optimizes the heat transfer. Moreover, by maximizing the turbulence of flow, heat transfer is further optimized. Finally, it is desirable to provide a high surface-to-volume ratio with respect to the fluid passages provided. With the present arrangement an optimized surface-to-volume ratio is provided which also serves to optimize heat transfer.

Other variables will become evident during the course of the following description of a further embodiment of the present heat exchange apparatus in the form of a steam generator, generally indicated at 54. As best shown in FIGS. 10–14, the steam generator 54 includes a generally cylindrical housing structure of ceramic material indicated at 56. Extending through the central portion of the cylindrical housing 56 is a burner assembly 58 of known construction. Mounted within each end of the cylindrical housing 56 is a main heat exchanger component, generally indicated at 60. In the embodiment shown, each of the main heat exchanger components 60 is formed of an elongated web of imperforate rigid heat conductive material, the web being folded along two intermediate parallel lines in opposite directions so as to form three strips 62, 64 and 66 disposed in superposed layer formation with respect to one another with the intermediate strip 64 being integrally connected along one of its end edges at one of the aforesaid fold lines as indicated at 68 with the adjacent end edge of the strip 62 and its opposite end edge integrally interconnected with the adjacent end edge of the strip 66 along the other fold line indicated at 70.

The intermediate strip 64 between the integrally folded end edges 68 and 70 provides opposed surfaces 72 and 74. The strip 62 includes a free end edge 76 which is disposed adjacent the end edge 70 of the intermediate strip. Between the free end edge 76 and the opposite end edge 68 the strip 62 is provided with opposed surfaces 78 and 80. In like manner, the strip 66 includes a free end edge 82 which is adjacent the end edge 68 of the intermediate strip 64. Between the free end edge 82 and the opposite end edge 70 of the strip 66 there are provided opposed surfaces 84 and 86. Each of the opposed surfaces of the strips is provided with irregularities which provide passage defining portions and force transmitting portions in the manner previously described. Such surface irregularity is preferably provided by knurling oppositely angularly related parallel ridges and troughs on opposite surfaces of the web prior to folding as aforesaid. With this configuration, the surfaces 72 and 80 of the strips 64 and 62 respectively will have their ridges crossing one another and interengaging to provide the force transmitting portions of the surfaces. In a similar manner, the ridges provided on the facing surfaces 74 and 84 of the strips 68 and 66 likewise will cross one another and interengage to provide the force transmitting portions of the surfaces.

Finally, it will be noted that the free end edge 76 of strip 62 is sealingly secured to the adjacent end edge 70 as by a line of brazing material, indicated at 88. In a like manner, the free end edge 82 of the strip 66 is sealingly secured to the adjacent folded end edge 68 as by a line of brazing material indicated at 90. Each component 60 is formed by tightly winding the folded web with the lines of brazing material thereon as previously indicated about a central core 92 in a spiral coil formation.

The heat transfer system illustrated in FIGS. 10–14 avoids many of the problems historically associated with metering precise amounts of high pressure heated vapors to expanders. In the packaged form shown, the invention is able to supply a two cylinder external combustion engine. The system is in part based upon the art of causing fluid being heated to follow a path which causes unusually intimate and extended surface contact with the walls through which heat is transferred. In the embodiment of FIGS. 10–14, the fluid being heated is caused to follow a long spiral path rather than the relatively short dual arcuate paths of the apparatus 12.

Selection of the actual clearances or passage cross-sectional area along this spiral path is based upon the thermal expansion rates of the materials chosen for the various elements of the invention and upon the desired response time for vapor generation. Response times, involving the time duration between the opening of a valve and delivery of a given portion of the mass of fluid charged into a heat exchange circuit, vary directly with the total clearance volume of the fluid side circuit. Small clearance volumes produce short response times. In applications of the invention involving external combustion engines, short response times are usually advantageous.

Engine horsepower or the rate of accomplished work is related to the pressure of the working fluid, the expander area exposed, and the rate at which the expander is moved. In positive displacement engines in which the heated vapors expand during the process of energy conversion, the subject invention offers further advantages. Introduction of the heated vapors to an expansion chamber at the instant expansion starts prevents the development of counter output torques. Further, delivery of the charge of vapors to be expanded in short times allows the engine to execute more complete cycles per unit time and thus operate at high power levels.

The choice of materials for elements of the invention influence net clearance volumes as a function of thermal expansion rates, elastic modulus, and thermal diffusivity. The selection of fluid to be heated also effects the optimum fluid side clearance volume. The molecular, size, viscosity, surface tension, wetting factor, density, and chemical stability of the fluid being heated as related to the materials chosen for the fluid heating surfaces must be considered. Thin fluids such as water which wet clean iron, nickel, copper, titanium, and aluminum based alloys allow minimum clearance.

Allowing the accumulated clearance to be cyclically advanced by an elastic force field developed through fabrication operations, from the region near the start of the fluid side continuous passage, offers a means by which response times may be shortened. Charging relatively cool liquid masses into the accumulated clearance volume allows introduction times to be minimized. Subsequent heat input to the low specific volume fluid causes a pressure rise and the fixed clearance volume thus tends to be elongated and moved along the spiral path toward the outlet end thereof by the pressure field developed as a result of heat addition. The action can properly be designated a peristaltic action.

Figure 13:
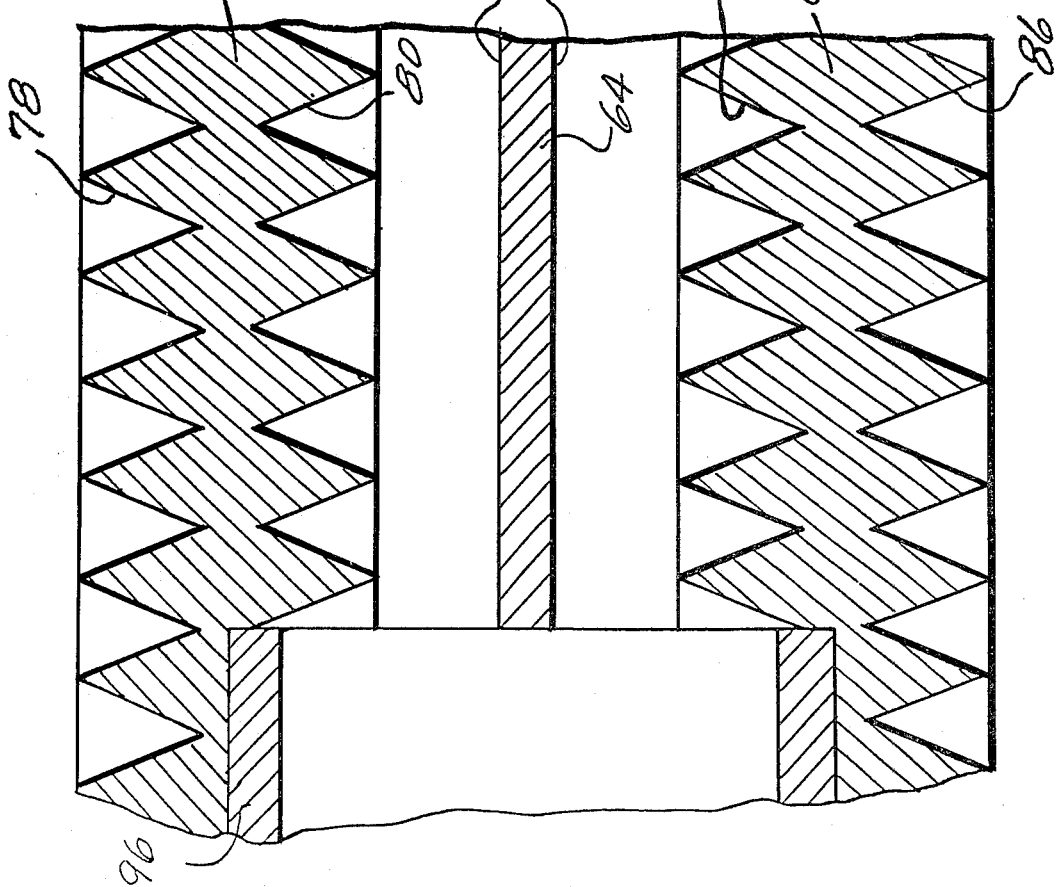
FIG. 13 is an enlarged fragmentary sectional view taken along the line 13—13 of FIG. 11.

In order to achieve such peristaltic action, it is necessary to provide for the cyclic introduction of the fluid at the inlet end of the spiral path. Moreover, the introduction must be such as to present a relatively large body of fluid to the passage so that an incremental portion thereof will have imparted thereto a starting inertia. To this end there is shown in FIG. 13 one method by which the fluid can be cyclically introduced so as to start the peristaltic action. As shown, the inner extremity of the spiral coil formation is suitably closed as by brazing and the next adjacent portions of the surfaces 72 and 74 of the inner strip 64 are recessed as indicated at 94. The recessing is accomplished prior to the fabrication of the web as indicated above and has the effect of removing the ridges from the initial portions of the surfaces 72 and 74. These recesses provide an increased inlet volume which can be more readily communicated with an inlet pipe, such as the pipe 96.

Maximization of the heat transfer to weight ratio or efficiency of the invention involves optimized selection of component dimensions, and selection of materials whose physical properties allow the fluid being heated to undergo thermophysical property changes without developing insulating films. The rate of travel within the clearance volume between the continuous spiral paths and the closeness of the passage defining portions of the surfaces must prevent stable separation of the vapor phase from the liquid phase.

Cyclic introduction of fluids to be heated from sources continuously adding heat presents another aspect of optimization in applications of the subject invention. Modern combustors achieve high heat release rates per unit volume but due to the high cost and inconvenience of pressurizing fuel and oxidants the processes are generally carried out at pressures less than three atmospheres. Vapor heated for high pressure processes in the chemical industries and energy conversion applications are generally required to be delivered at more than fifty atmospheres. Heat transfer processes tend to be directly influenced by pressure. Through the same thermal gradients, low pressure populations of gas molecules exchanging heat with solid surfaces tend to have lower heat transfer rates than high pressure populations of gas molecules exchanging heat with solid surfaces. This is due in part, to the greater number of contacts between gas molecules and the solid surfaces per unit time in the high pressure case. Thus the rate at which heat can be added to the high pressure fluid being heated, generally exceeds the rate at which heat can be taken from a combustion source. In the present invention this is particularly true because of molecular movement factors. The time during which heat is continuously added may therefore be considerably greater than the response time of the fluid heating circuit. Applications benefiting from weight saving designs therefore favor the use of high specific heat materials for elements of the invention. Aluminum, magnesium, and titanium alloys, and compounds or composites containing boron, carbon, lithium, beryllium, hydrogen, silicon, and nitrogen thus are particularly useful in the subject invention compared to conventional heat exchangers.

Figure 9:
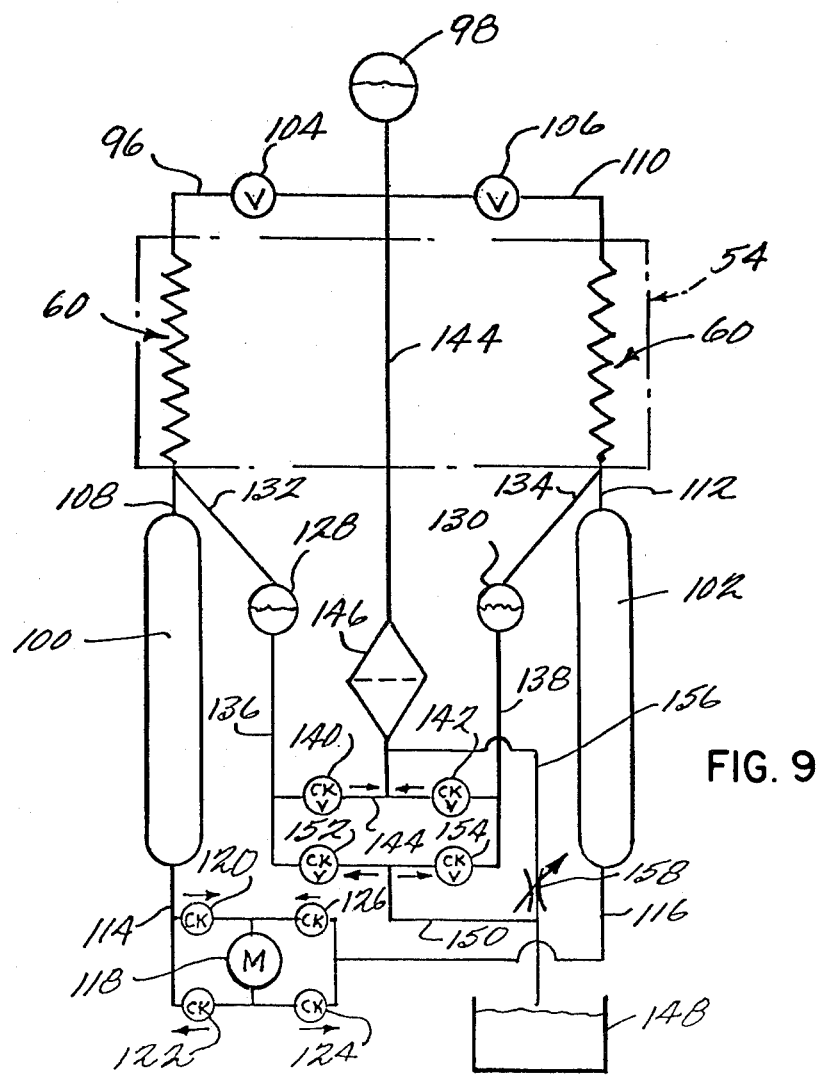
FIG. 9 is a schematic view of an external combustion engine utilizing the heat exchanger of FIGS. 1–6.

FIG. 9 illustrates schematically an external combustion engine of the type disclosed in my U.S. Pat. No. 3,830,065, which exemplifies an important application of the steam generator 54. Because of the ability of the steam generator 54 to deliver charges of high pressure heated vapors in unusually short response times, pressure fluctuations in the heated fluid circuit characterize the operation of the engine. Such pressure fluctuations offer an unusually simple opportunity to pressurize fluids to be heated.

The engine includes an accumulator 98 which is alternately communicated with one of a pair of pressure vessels 100 and 102 under the control of valves 104 and 106. The steam generator 54 is provided between the pressure vessels 100 and 102, with one of the components 60 being mounted between the valve 104 and the vessel 100 and the other of the components 60 being connected between the valve 106 and the vessel 102. To further illustrate the hook-up as schematically illustrated in FIG. 9, the conduit 96 is shown as leading from the valve 104 with the outlet pipe of the unit 60 indicated at 108 extending to the vessel 100. The other component 60 has an inlet pipe 110 which corresponds to the pipe 96 which leads from the valve 106 and an outlet pipe 112 which leads to the vessel 102.

As indicated in my aforementioned patent, each of the vessels 100 and 102 includes a flow pipe 114 and 116 for effecting operation of a hydraulic motor, generally indicated at 118. The cyclical movement of pressurized liquid alternatively inwardly and outwardly of the flow pipes 114 and 116 is converted to a constant rotational movement of the motor 118 by a series of check valves 120, 122, 124 and 126, all in accordance with the disclosure of the aforesaid patent. For a more detailed understanding of this aspect of the engine reference may be had to the patent, the disclosure of which is hereby incorporated by reference into the present specification.

The circuit also includes a pair of reservoirs 128 and 130, the reservoir 128 having its high pressure side connected with the high pressure side of the vessel 100 as by a conduit 132. A similar conduit 134 is provided between the vessel 102 and the reservoir 130. The liquid side of each of the reservoirs 128 and 130 is connected with the accumulator 98 through conduits 136, 138, check valves 140, 142, and conduit 144. Preferably conduit 144 has a filter 146 in series therewith. Low pressure feed water is supplied to the reservoirs 128 and 130 from a supply tank 148 through a feed line 150 to the conduits 136 and 138 respectively, through check valves 152 and 154 respectively. The inlet side of the filter 146 is connected with the feed line 150 by a line 156 having a pressure relief valve 158 provided therein.

In operation, fluid at $p_1$ supplied by accumulator 98 is allowed to pass through valve 104 into the associated clearance volume of the steam generator 54. As a result of heat transfer within generator 54, pressure rapidly builds to $p_2$ where $(p_2 > p_1)$ and the charge of heated vapor is delivered to outlet conduit 108 to energize the pressure vessel 100. A small portion of the vapor delivered at pressure $p_2$ is allowed to enter reservoir 128 through line 132. Liquid is thus forced from reservoir 128 into accumulator 98 through check valve 140 and line 144 until the instantaneous pressure ($p_2$) plus impedances of the delivery circuit equals $p_1$. When $p_2$ subsides or the effective pressure within reservoir 128 drops because of cooling, feed water enters from 150 through check valve 152 and replenishes reservoir 128. In the meantime the other side of the circuit involving reservoir 130 and valve 106 goes through a similar cycle in phased relation.

In applications of the invention in which the vapor pressure in pressure vessel 100 (or 102) does not fall below the pressure at 150, reservoir 128 may be designed as an extended surface heat sink to rapidly cool steam collected there to vapor pressures below the pressure at 150. The impedance of the portion of circuit between pressure vessel 100 (or 102) and reservoir 128 plus the impedance of conduit 132 must be sufficient in such cases to allow a more rapid drop in reservoir vapor pressure by cooling the bleed-through pressure replenishment from vessel 100.

As shown in FIG. 9, the system may utilize more than one low clearance volume fluid heating circuit and accordingly more than one accumulator pressurization circuit. Using multiple fluid heating circuits provides more even accumulator charging and thus reduces the size of required accumulator.

Another means of reducing the complexity of the invention involves placing the accumulator in regions receiving heat. Heating the fluid in the circuit between check valves 140 or 142 and valves 104 or 106 increases the fluid's vapor pressure. Vapor from the fluid is thus added to the gas above the liquid in accumulator 98. In some cases, the selection of fluid being heated allows satisfactory operation of the accumulator entirely from the vapor pressure of the fluid being heated. Water or water based fluids serve as an example as they generate very substantial saturated vapor pressures at relatively low temperatures.

Although the system diagrammed in FIG. 9 has been found to be stable in operation and able to offer improved performance over conventional feed water pumps, it may require short term pressure relief from time to time. Conditions implying the need for pressure relief subsystems are listed categorically below.

1. Large Turn Down Ratios

Application of the invention with highly variant input heat fluxes. An accumulator using saturated vapor of the fluid being heated, sized to perform smoothly at low input heat fluxes may require pressure relief at high heat fluxes.

2. Emergency Shut Down

High pressure systems may not have sufficient over pressure capacity to allow valves 104 or 106 to be shut down indefinately without pressure relief subsystems.

3. Fail Safe Requirements

Actuator failures or plugging of valves 104 or 106, and other possible undesired events preventing normal operation of the charging circuit may be safely provided for by a pressure relief subsystem. Thus in applications requiring pressure relief, it is usually preferred to use a relief valve 158 dumping to low pressure line 150.

Another important application of the steam generator 54 shown in FIGS. 10-14 is in secondary oil recovery. There are many secondary oil recovery systems. Most of the systems are designed to at least pressurize partially depleted oil sands and thus force oil into conduits which may be pumped or provide free flow to the surface. Many secondary oil recovery systems supply heat in addition to pressurizing the oil formation. Addition of heat to the partially depleted oil reserves is beneficial because vapors released by the heated oil aid in pressurizing the reserve and the oil viscosity tends to be lowered with increasing temperature thus producing lower flow impedance.

The steam generator shown in FIGS. 10-14 is a lightweight, inexpensive, disposable steam generator particularly suited for secondary oil recovery operations when used in the self pressurizing mode of FIG. 9.

Figure 3:
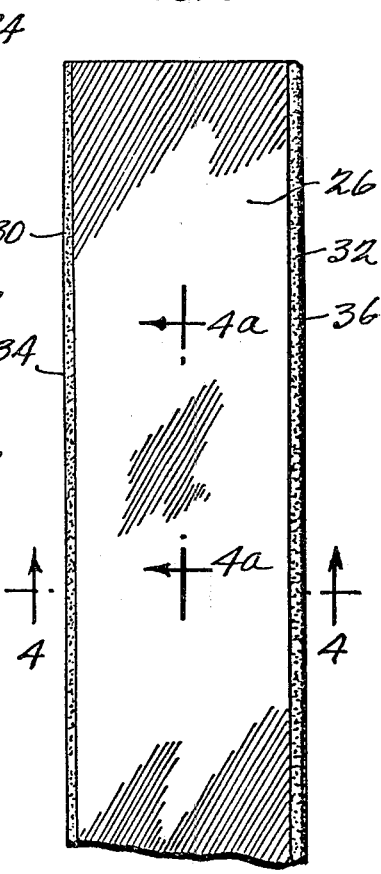
FIG. 3 is a similar view showing the two strips mounted together in transversely aligned layer relation illustrating the manner in which each adjacent pair of end edges is sealingly secured together.
Figure 4:
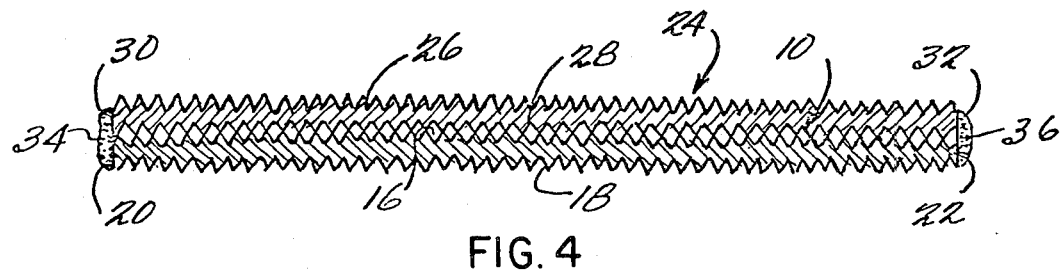
FIG. 4 is an enlarged sectional view taken along the line 4—4 of FIG. 3.

Provision of required clearance volumes may utilize the methods discussed in reference to FIG. 3 or employ clearance volume coils (not shown). In the secondary recovery application, the development of steam in each of two double tube coils (not shown) allows overlap of the pressure pulsations. Feed water is sequentially charged into coils thus making more or less steady pressure at the outlet which is connected to a conduit delivering steam to the oil formation being heated and pressurized.

Review of characteristic dimensions of the system shown in FIGS. 10-14 illustrates important advantages compared to conventional secondary oil recovery boilers. In a typical fabrication of the embodiment of FIGS. 10-14 having the dimensions, $d_1=2$ inches, $d_2=10$ inches, W.O.=$\frac{3}{4}$ inch using a stock thickness of 0.030 inch for the flat "S" double tube, the length of fluid travel in each channel of the double tube is approximately 3456 inches or 288 feet. The area of exposure is about 5180 square inches or 36 square feet. Response times of about 0.013 seconds characterize such an assembly. The entire assembly including containment rings and refractory insulation, weighs about 260 lbs. including the self pressurization circuit but not filter 146. Conventional packaged boiler with the same heat transfer ratings typically weigh more than ten times as much and are far too expensive to be considered disposable.

The selection of filter 146 depends upon the quality of available water, the required system life, and other economic factors. In many applications a simple strainer will suffice. In other applications where only heavily mineralized or salty water is available, it is recommended that filter 146 be reverse osmosis membrane.

In the instance that filter 146 is required to be a reverse osmosis membrane, pressure relief valve 152 must be selected for continuous rather than intermittent duty. Regulating the pressure at which bypass to line 150 occurs (through 152) enables control of pressure ($p_1$), the bypass ratio to the reverse osmosis membrane, and thus may require servo operated compensation. Compensation required is usually a function of actual $p_1$ compared to the desired pressure at the accumulator and may be regulated as a function of the change in conductivity of the water across the reverse osmosis membrane. Use of the reverse osmosis membrane prevents relief valve 152 from serving the failure sourced over pressure events previously described. A second fail safe relief valve is therefore recommended in installations utilizing reverse osmosis filters and should be placed between filters 146 and valves 104 or 106.

Figure 15:
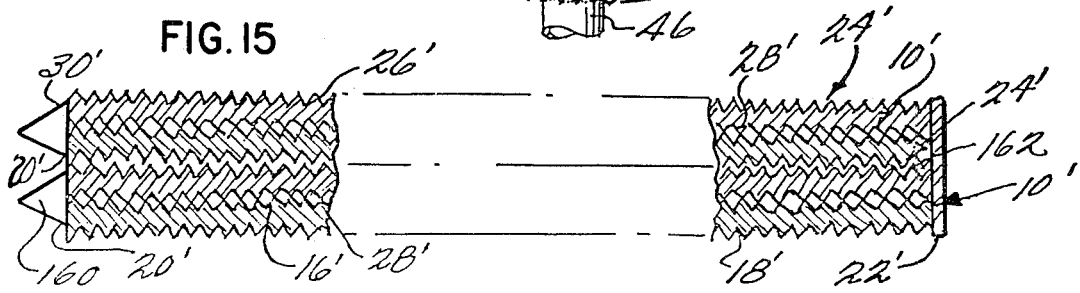
FIG. 15 is a view similar to FIGS. 4 and 12 illustrating a preferred modification of the structure when utilized as a solar energy collector.

FIG. 15 illustrates an embodiment of the invention particularly adapted toward solar energy conversion applications. The figure illustrates a cross-section similar to FIG. 4 of two adjacent loops of a coil formation component similar to the component 14. In the figure, elements corresponding to those utilized in the embodiment of the component 14 are designated by corresponding prime numerals. The main difference is that the line of brazing 34 is replaced by an elongated body of brazing material having a triangular cross-sectional configuration, as indicated at 160. The brazing 36 may be totally replaced by a welded plate such as plate 162. The triangularly shaped configuration of the brazing material 160 faces the solar rays and directs the same into the passage formed between the adjacent surfaces 18' and 26'. Since the transmission of the heat energy to the surface does not require a fluid flow, the other end of the surfaces can be blocked as by the plate 162. It will also be understood that it may be desirable to arrange the triangular brazing material 160 so that they are aligned in a dish-shaped configuration rather than the planar configuration of FIGS. 1-8. Moreover, when utilized with a center frustoconical reflector (not shown), the body of brazing material 160 may be formed in a helical arrangement around the frustoconical reflector concentrically therewith.

Solar energy impinging on the face of the embodiment undergoes absorbtion and multiple reflections between the slanted surfaces and knurled passageways to produce a selective surface effect. The actual area entering into absorbtion and reflection interactions with incoming light far exceeds the apparent area of the device. Energy loss by radiation outward from the collector is limited, compared to incoming energy gain, by the smaller apparent area available for emissive radiation. The selectivity resulting is approximately equivalent to the ratio of the actual surface area available including a portion of the knurled features within the coils, to the apparent area. This geometric basis of achieving selectivity is particularly desirable for use with concentrating collectors.

In applications where higher temperatures and greater heat input rates are needed than available from flat plate collectors, surface stability may be difficult to manage in conventional collector systems. Metal surfaces tend to oxidize ruining platings and conversion coating types of selective surfaces. Paints are degraded and often peel away. The subject invention however, excells in high temperature applications due to the geometrical basis employed for its achieved selectivity.

In operation, previously described pumping may be employed or the internal passageways may be continuously filled by a separate compressor or pump. Parallel flow for reducing the resistance to fluid flow may be achieved by drilling inlet and outlet passageways as shown in FIG. 4.

In all of the embodiments of the invention, unusual weight savings are obtained compared to conventional heat exchangers. Also of importance is the high degree of manufacturability offered by the embodiments of the invention. Time consuming, difficult manufacturing steps associated with handling a bundle of tubes and achieving seals at inlet and outlet manifolds or heaters are avoided. Fastening extended surfaces such as fins to fluid carrying tubes as in conventional heat exchangers is also avoided by use of the rapid formed flat tubes disclosed.

It thus will be seen that the objects of this invention have been fully and effectively accomplished. It will be realized, however, that the foregoing preferred specific embodiment has been shown and described for the purpose of illustrating the functional and structural principles of this invention and is subject to change without departure from such principles. Therefore, this invention includes all modifications encompassed within the spirit and scope of the following claims.

What is claimed is:

1. A solar energy heat exchanger comprising
    a plurality of thin imperforate webs of rigid heat conducting material,
    each of said webs having a pair of relatively wide opposed surfaces bounded in one direction by a pair of spaced relatively thin edges so as to provide said web with a cross-sectional configuration which is elongated in a direction transverse to said one direction,
    said webs being generally transversely aligned and disposed in a layer formation in which each of the surfaces of each web is disposed in facing relation to the opposite surface of an adjacent web in the layer formation,
    each pair of facing surfaces including passage defining portions and force transmitting portions,
    certain of the webs having both end edges thereof sealingly secured to the corresponding end edges of an adjacent web so as to define with the passage defining portions of the facing surface associated therewith first fluid passage means having a flow direction extending generally in said one direction along said webs,
    certain of said webs having at least one end edge thereof disposed out of sealing engagement with a corresponding end edge of the adjacent web so as to define with the passage defining portions of the facing surfaces associated therewith solar energy passage means extending transversely inwardly of the aforesaid one end edges of said webs toward the opposite end edges thereof,
    means on the aforesaid one end edges of said webs for facilitating passage of solar energy into said solar energy passage means for absorption and multiple reflection therein,
    means on said opposite end edges of said webs for retarding the passage of solar energy from said solar energy passage means outwardly of said opposite end edges,
    the force transmitting portions of each pair of facing surfaces being disposed in force transmitting relation with respect to one another in the direction said facing surfaces face one another so that forces created by the fluid pressure and temperature conditions within said fluid passage means tending to deform said webs in said facing directions are resisted to thereby prevent deformation which would otherwise occur in the absence of said force transmitting relationship and permit the utilization of wall thicknesses less than that required to be self-sustaining in order to prevent such deformation, and
    means for directing first fluid means into and out of said first fluid passage means.

2. A heat exchanger as defined in claim 1 wherein the sealing securement between one pair of corresponding end edges is effected by brazing.

3. A heat exchanger as defined in claim 1 wherein the sealing securement between one pair of corresponding end edges is effected by a folded portion formed integrally with said one pair of corresponding end edges.

4. A heat exchanger as defined in claim 1 wherein said coil formation is a spiral and the facing directions of said surfaces are radially inwardly and radially outwardly with respect to the axis of the spiral coil formation.

5. A heat exchanger as defined in claim 1 wherein said strips are formed of metal.

6. A heat exchanger as defined in claim 1 wherein the pair of facing surfaces associated with said transverse fluid passage means includes indentations and projections, said force transmitting portions being provided by said projections and being in metal-to-metal contact.

7. A heat exchanger as defined in claim 6 wherein said indentations and projections are knurled in each surface in generally parallel relation extending transversely from one end edge to the other end edge thereof.

8. A heat exchanger as defined in claim 7 wherein the knurled indentations and projections in one of the pair of facing surfaces extend transversely in a direction at an angle with respect to the knurled indentations and projections in the other of said pair of facing surfaces.

* * * * *